United States Patent Office 3,538,172
Patented Nov. 3, 1970

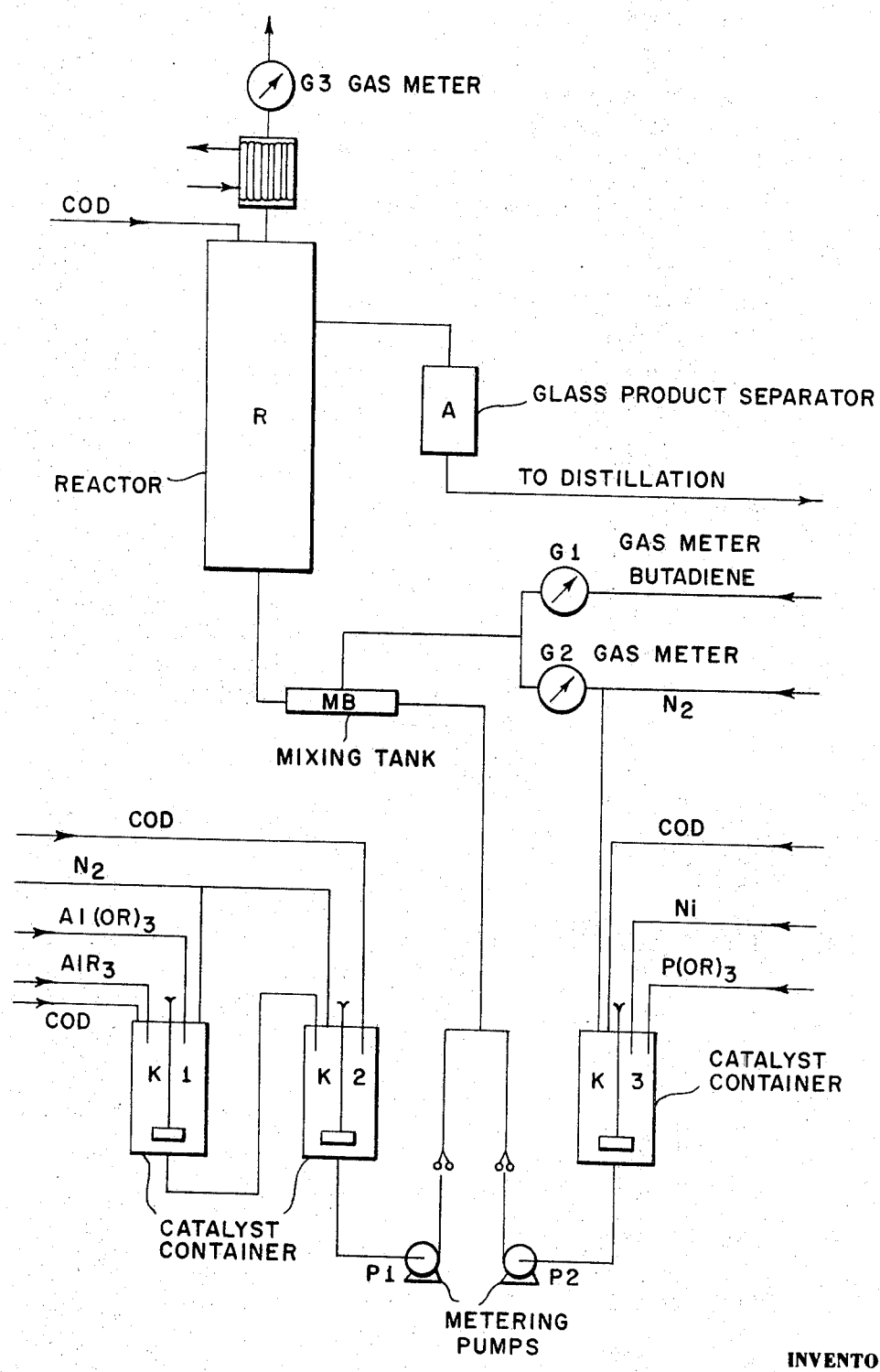

3,538,172
CONTINUOUS PROCESS FOR THE PRODUCTION OF CYCLOOCTADIENE
Udo Hochmuth, Norbert Wilke, and Roland Streck, Marl, Germany, assignors to Chemische Werke Huls Aktiengesellschaft, Marl, Germany
Filed Oct. 3, 1969, Ser. No. 863,464
Claims priority, application Germany, Oct. 19, 1968, 1,804,017
Int. Cl. C07c 3/16, 3/20, 13/26
U.S. Cl. 260—666  8 Claims

ABSTRACT OF THE DISCLOSURE

An improvement in the process of reacting 1,3-butadiene in the presence of mixed catalysts of nickel compounds reduced by means of an organoaluminum compound and modified by an organophosphite or phosphine to produce cyclooctadiene wherein diethylisopropoxyaluminum is employed as the organoaluminum compound and the process is carried out continuously at a temperature between about 60° C. and 180° C.

CROSS-REFERENCE TO RELATED APPLICATION

Applicants claim priority under 35 U.S.C. 119 for Application Serial No. 1,804,017, filed in the Patent Office of the Federal Republic of Germany on Oct. 19, 1968.

BACKGROUND OF THE INVENTION

The field of the invention is cycloaliphatic dienes and particularly the method of producing 1,5-cyclooctadiene.

The state of the prior art processes for manufacturing cycloaliphatic dienes such as 1,5-cyclooctadiene may be ascertained by reference to U.S. Pat. 2,964,575 of Sekul et al., which issued Dec. 13, 1960, and German published applications 1,140,569; 1,144,268; and 1,244,172. The diethylisopropoxyaluminum found useful as a raw material in the present application is disclosed in U.S. Pat. 3,219,-591 of Vandenberg, which issued Nov. 23, 1965.

The patent of Sekul et al. discloses a process for the production of 1,5-cyclooctadiene by contacting 1,3-butadiene with a nickel carbonyl organophosphite catalyst in the presence of a solvent and at a temperature between about 90° C. and 150° C. wherein a cycloaliphatic diene catalyst activator is used. The patent of Sekul et al. incorporates by reference the catalysts disclosed in U.S. Pats. 2,686,208 and 2,686,209 of Reed.

The patent of Vandenberg discloses the use of diethylisopropoxyaluminum as a catalyst in polymerizing epoxides.

German published applications 1,140,569; 1,144,268; and 1,244,172 disclose that butadiene can be dimerized to cyclooctadiene (COD) with high selectivity and in large yields.

According to the German applications the catalysts preferably employed are obtained by the reduction of nickel compounds to the zerovalent condititon. Catalysts of particular selectivity are those produced by the reduction of nickel acetylacetonate with trialkyl aluminum and subsequent modification with an electron donor, such as, for example, triphenylphosphine or similar aryl or alkyl phosphines, or phosphites, and these are disclosed in DAS 1,140,569 (German published application).

In order to produce COD economically, a continuous reaction is necessary, as described in Example 62 of DAS 1,140,569. In this process, a solution of the catalyst of nickel acetylacetonate, triphenylphosphine and dialkylethoxyaluminum in benzene is introduced, together with butadiene, into a heated capillary copper tube under a pressure of 30 atmospheres gage, and reacted for 60 minutes. With a quantitative butadiene conversion, 98% cyclic oligomers is obtained, namely, in addition to 67.2% of COD, 20.9% of vinylcyclohexene and 9.9% of cyclododecatriene (CDT). This result is unsatisfactory, especially since in Example 63 of DAS 1,140,569, with a somewhat changed catalyst composition and in a discontinuous operation, the COD content in the reaction product amounts to 95.3%.

The catalyst disclosed in Example 61 of DAS 1,140,569 cannot possibly be used for a continuous operation since an insoluble deposit precipitates from the catalyst charge of nickel acetylacetonate, tri-(o-hydroxydiphenyl)-phosphite and diethylethoxyaluminum, which deposit adheres to the walls of the reaction vessel and to the conduits and clogs them. This precludes the use of a capillary tube as the reaction tube. Furthermore, this precipitation removes uncontrollable amounts of nickel from the reaction solution. Consequently, an accurate observance of the catalyst concentration and catalyst conditions, which must be kept within narrow limits in this connection, is not ensured with the result that the yields of COD vary.

In view of these limitations of the prior art, there is considerable interest in a catalyst which, on the one hand, does not cause appreciable deposits, and, on the other hand, permits the production of COD with a high degree of selectivity.

SUMMARY OF THE INVENTION

Having in mind the limitations of the prior art, it is an object of the present invention to improve the process of reacting 1,3-butadiene with a catalyst of nickel acetylacetonate with trialkylaluminum and an aryl or alkylphosphine or phosphite, to produce 1,5-cyclooctadiene by employing diethylisopropoxyaluminum as the organoaluminum compound.

BRIEF DESCRIPTION OF THE DRAWING

The figure of the drawing is a flowsheet which shows a preferred embodiment of carrying out the present invention.

In the drawing, K1, K2 and K3 are catalyst containers. These catalyst containers are filled from overhead lines and the contents thereof are fed through metering pumps P1 and P2 to the mixing tank MB. Gas meters G1, G2 and G3 are used to control the gas entering and leaving the reactor. Butadiene is fed through gas meter G1 to the mixing tank MB and into the reactor R. The product is fed through glass product separator A to the distillation where the cyclooctadiene is separated. A water-cooled condenser is inserted at the top of the reactor below the gas meter G3.

The 1,3-butadiene employed as the starting material of the present invention is preferably a pure product which, in particular, is free of 2-butyne, 1,2-butadiene and 1-butyne. It is possible to employ any technical 1,3-butadiene which does not contain secondary ingredients which consume the catalyst.

Suitable nickel compounds which can be reduced are hydrocarbon-soluble substances, such as nickel acetylacetonate, nickel ethylacetoacetate, nickel benzoylacetonate, nickel octoate and preferably, nickel acetylacetonate and nickel octoate, especially nickel acetylacetonate.

Suitable phosphorus-containing compounds which act as electron donors are, for example, alkyl phosphines, aryl phosphines, alkyl phosphites and aryl phosphites. The compounds which are preferably employed in this connection are triethylphosphine, triethylphosphite, triphenylphosphite, triphenylphosphine, and diphenylphosphine, especially tri-(o-hydroxy-diphenyl)-phosphite.

Diethylisopropoxyaluminum is obtained in a conventional manner by the proportional combination of aluminum isopropylate with triethylaluminum in a molar ratio of 1:2 at temperatures of 30–50° C., preferably in the presence of an inert solvent, such as hydrocarbons, but particularly in the presence of COD.

The three catalyst components can be employed in a molar ratio of P:Ni:Al of about 1:2:7.8 to about 1:1:5.5, preferably 1:2:6.0.

The amount of the catalyst, calculated as the nickel complex and based on the butadiene being dimerized, is dependent on the rate of the reaction and the quantity of butadiene consumed, which can be readily controlled during the reaction by the amount of the waste gas. The amount of waste gas is about 0.5–1.1 grams per 100 grams of butadiene charged.

The reaction is conducted at temperatures of 60–180° C., preferably between 60 and 120° C. and especially between 80 and 105° C. In this connection, the process can be conducted under superatmospheric pressure.

In general, the reaction is carried out in the presence of a liquid, inert reaction medium, for example benzene and other hydrocarbons.

In accordance with a preferred embodiment of the invention, charged COD is employed as the inert reaction medium. This results in the surprising advantage that the reaction, in a continuous operation, can be conducted without excess pressure, and the butadiene is converted almost quantitatively in a continuous reactor. Without excess pressure, according to the invention, means working under atmospheric pressure.

A further advantage resides in that, as the reaction product, a high-percentage COD is initially obtained, from which the by-products are removed more readily and with fewer complications than with the use of an additional solvent. Since, in general, the mixed catalyst is prepared by reacting the individual components in an organic inert solvent, one selects (when the dimerization of the butadiene is conducted in charged COD) also the same solvent for the catalyst preparation.

A further advantage of the continuous production of COD in accordance with the invention resides in that the catalyst is formed continuously in a mixing vessel upstream of the reactor, or in the reactor proper. The production of the catalyst takes place in the feed conduit or in a mixing vessel upstream of the reactor. The individual starting materials for the catalyst are charged, dissolved or suspended in COD, under butadiene pressure into a mixing vessel in front of the reactor, and from there, together with the butadiene required for the reaction, into the reactor proper. The use of a mixing vessel upstream of the reactor is not absolutely necessary in order to conduct the process in a satisfactory fashion, but it is advantageous from the viewpoint of safe operation.

In addition to the avoidance of undesired deposits, the use of diethylisopropoxyaluminum according to the invention affords a further advantage, since the preparation of diethylisopropoxyaluminum by the proportional combination of inexpensive aluminum isopropylate with triethylaluminum is simpler and presents fewer dangers than the production of the corresponding ethoxy compound. The selectivity of the formation of COD does not change in the present process; in the (solvent-free) reaction product, 92–95% of COD is obtained. It is advisable, when employing commercial butadiene, not to attempt a 100% conversion, since the concentration of the secondary ingredients in the commercial butadiene becomes too high, so that this affects the reaction proper. Rather, it is more advantageous in those cases to contemplate butadiene conversions of between 95 and 97%.

The processing of the crude product does not present any difficulties, since the only operation to be conducted, especially when employing COD as the reaction medium, is a distillation step.

Without further elaboration, it is believed that one skilled in the art can, using the preceding description, utilize the present invention to its fullest extent.

The following comparative Examples 1, 2 and 3 show, in a comparison with respect to the state of the art, the effect of the use of diethylisopropoxyaluminum in a discontinuous charge, and Example 4 demonstrates an embodiment of the continuous production of COD in accordance with the invention and as shown in the figure of the drawing.

EXAMPLE 1

Comparative example

With agitation, 75 grams=0.29 mole of nickel acetylacetonate is dissolved in 900 ml. of pure anhydrous cyclooctadiene and mixed, at 20° C. with 159 grams=0.29 mole of tri-(o-hydroxydiphenyl)-phosphite. In order to maintain the suspension in solution, the reaction mixture is constantly agitated. The mixture is cooled to 5° C. and, within 2 hours, 300 ml. of butadiene is introduced in the gaseous phase. Then, 168 grams=1.29 mole of diethylethoxyaluminum is added within 10 minutes. The red-brown solution produced is diluted with 5 liters of pure anhydrous COD and introduced, with the exclusion of air, into an agitated kettle having a capacity of 250 liters and purged with nitrogen. The reaction mixture is heated to 70° C., and approximately 4 liters/hr. of liquid butadiene are charged into the agitated kettle. The waste gas amounts to about 0.4–0.7 liter/hr. In total, 236 liters=153.4 kg. of liquid butadiene is introduced. The crude reaction product amounts to 145 kg. Considering the amounts employed during the catalyst preparation, the conversion is 92.2%. The crude product exhibits the following composition in accordance with the gas chromatogram:

| | Percent |
|---|---|
| Butadiene | 0.15 |
| Vinylcyclohexene | 4.5 |
| Intermediate product | 0.35 |
| 1,5-cyclooctadiene | 93.3 |
| CDT (cyclododecatriene) | 0.7 |
| Residue | 1.0 |

The distillation of the crude reaction product yields a 1,5-cyclooctadiene having a purity of 99.8%, in addition to 0.15% of vinylcyclohexene.

When the above charge is repeated, the waste gas increases from charge to charge, with the process being conducted in the same manner, and, after 4 charges, amounts to 160–180 liters/hour. Upon opening the reactor, a black, gummy coating is observed on the walls of the reactor and on the stirrer blade, consisting predominantly of nickel.

Example 1 is carried out at atmospheric pressure.

EXAMPLE 2

The formation of the black, gummy coating in the reactor observed in Example 1 is avoided by the use of diethylisopropoxyaluminum in place of diethylethoxyaluminum:

With agitation, 77.1 grams=0.3 mole of nickel acetylacetonate, and 161.1 grams=0.3 mole of tri-(o-hydroxydiphenyl)-phosphite are suspended in 1000 ml. of pure dry COD (cyclooctadiene) at 20° C. Within 2 hours, 300 ml. of 1,3-butadiene is introduced in the gaseous phase. Then, with agitation, at 20–30° C., 266 grams=1.85 mole of diethylisopropoxyaluminum dissolved in 5000 ml. of pure anhydrous COD is added. During the addition step, the reaction mixture becomes a solution, assuming a red-brown color. The catalyst solution is filled, with the exclusion of air, into the 250 liter agitated kettle of Example 1, which is cleaned and purged with nitrogen. After heating to 70° C., approximately 4 liters/hr. of liquid 1,3-butadiene is charged into the reactor, as in Example 1. The waste gas amounts to about 0.1–0.3 liters/hour. In total, 220 liters=143 kg. of liquid 1,3-butadiene are charged. The crude reaction product is 137 kg., the conversion is 93.1%, with a content of 94.9% of 1,5-cyclooctadiene. When repeating the above charge without an intermediate cleaning of the reactor, the waste gas does not increase after 3 charges, in contrast to Example 1. After opening the reactor, only an insubstantial black coating, which is not sticky, is observed.

EXAMPLE 3

By substituting, in Example 2, the 0.3 mole of nickel acetylacetonate by 0.3 mole of nickel octoate or by 0.6 mole of nickel octoate or nickel acetylacetonate, or by 0.45 mole of nickel benzoylacetonate, a comparatively good result is obtained.

The same holds true when employing in place of tri-(o-hydroxydiphenyl)-phosphite, triphenylphosphine, tri-n-butylphosphine, diphenylphosphine, triethylphospite, or triphenylphospite.

Both components are also combined, with the same success, at 0° C., for example, instead of at 20° C.

It is also possible to operate with 100 or 200 ml. of butadiene, instead of 300 ml., without impairing the efficiency of the present process.

Increasing the amount of diethylisopropoxyaluminum employed from 1.85 mole to 3.7 mole yields the same, very satisfactory result, and the same holds true for a reduction of 1.50 mole.

The butadiene is reacted just as well, for example, at 60° C. as at 70° C.

The pressures used in carrying out the processes of Examples 2 and 3 vary between about 0.8 and 1.4 atmospheres, and preferably between 1.0 and 1.2 atmospheres.

EXAMPLE 4

The process is conducted in the apparatus shown in the drawing.

The catalyst charging tanks are clean 5 liter glass bottles, from which the solutions are conducted via austenitic stainless steel conduits and by way of the diaphragm pumps P1 and P2 into the mixing tank MB, which latter, just as the 3 liter reactor R, consists of stainless steel of the austenitic type. Reference symbol A denotes a product separator of glass; G1, G2 and G3 are gas meters.

Preparation of the catalyst

Before start-up, all containers, conduits, and the oxygen-free nitrogen reactor are purged with oxygen-free nitrogen dioxide and, during operation, are maintained under a nitrogen atmosphere.

Organo aluminum compound

Catalyst container K1.—153 grams of aluminum isopropylate are dissolved in 1000 ml. of pure dry COD and proportionally combined with 204 grams of triethylaluminum at 30–40° C. Thereafter, the reaction solution is diluted to 1500 ml. with COD, thus obtaining a solution which contains 275 grams and 183 grams/hour respectively, of active diethylisopropoxyaluminum.

Catalyst container K2.—245 ml. of the organoaluminum solution is diluted in catalyst container K2 to 1000 ml. with COD. In this case, the solution contains 4.48 grams of active catalyst per 100 ml.

Catalyst container K3 (Ni-P catalyst).—20.8 grams of nickel acetylacetonate and 21.6 grams of tri-(o-hydroxydiphenyl)-phosphite are stirred in 600 ml. of COD at 60° C., for 30 minutes; then, the solution is diluted to 1000 ml. with COD. The solution is constantly agitated in order to maintain the suspension in motion.

The reactor R is filled with COD up to the overflow, and purged with oxygen-free nitrogen charged at 1.0 liter/hour by way of the gas meter G2. The reaction mixture is heated to 70° C., and 20 liters of 1,3-butadiene are charged per hour in the gaseous phase. By way of the metering pumps P1 and P2, catalyst is introduced from containers K2 and K3 at respectively 50 ml. of solution per hour. The reaction is detected by a rise in the reactor temperature; the temperature is allowed to increase to 100° C., and then cooling is performed. The introduction of gaseous butadiene is regulated so that the waste gas amounts to 6.0–6.2 liters/hour. The butadiene consumption is about 200 liters/hour. In the separator A, 550–600 ml. per hour of crude COD is obtained. According to gas chromatography, the crude product exhibits the following composition:

|  | Percent |
|---|---|
| Butadiene | 1.77 |
| Intermediate product | 0.22 |
| Vinylcyclohexene | 3.94 |
| Intermediate product | 0.22 |
| 1,5-cyclooctadiene | 93.13 |
| CDT | 0.72 |

By distilling the crude product in a multifilament column of 60 cm., a cyclooctadiene is obtained having a purity of 99.2–99.6%. The balance after a longer period of operation calculated on the hourly conversion, results in the following values.

|  | G. |
|---|---|
| Butadiene feed | 485 |
| Waste gas | 14.4 |
| Catalyst (calculated as free of solvent) | 4.36 |
| Product: |  |
| Gross | 561 |
| Net | 471 |

This corresponds to a butadiene conversion of 97%.

The reactor pressures used in carrying out the continuous process vary between about 0.7 and 2.0 atmospheres and preferably between 0.8 and 1.2 atmospheres, especially atmospheric pressure is used.

The preceding examples can be repeated with similar success by substituting the generically and specifically described reactants in the operating conditions of this invention for those used in the preceding examples.

What is claimed is:

1. In a process for the production of cyclooctadiene by contacting butadiene with a catalyst consisting essentially of a nickel acetylacetonate, nickel ethylacetoacetate, nickel benzoylacetonate or nickel octoate reduced with trialkylaluminum and modified by an organophosphorous compound selected from the group consisting of aryl phosphines, alkyl phosphines, aryl phosphites and alkyl phosphites in the presence of an inert liquid reaction medium, and at a temperature between about 60° and 180° C., the improvement comprising using diethylisopropoxyaluminum as the organoaluminum compound and carrying out the process continuously.

2. The process of claim 1, wherein the inert liquid reaction medium is cyclooctadiene.

3. The process of claim 1, wherein the process is conducted without excess pressure.

4. The process of claim 1, wherein the catalyst is formed continuously in a mixing vessel upstream of the reactor.

5. The process of claim 1, wherein the catalyst is formed continuously in a reactor.

6. The process of claim 1, wherein the molar ratio of phosphorous compound to nickel compound to organoaluminum compound is about 1:2:7.8 to about 1:1:5.5.

7. The process of claim 6 wherein the molar ratio is about 1:2:7.8 to about 1:2:6.0.

8. The process of claim 1, wherein the phosphorous compounds are selected from the group consisting of triethyl phosphine, triethyl phosphite, triphenyl phosphite, triphenyl phosphine, diphenyl phosphine, and tri-(2-hydroxydiphenyl)-phosphite.

References Cited

UNITED STATES PATENTS 2,964,575  12/1960  Sekul.
2,686,208  8/1954  Reed.
2,686,209  8/1954  Reed.
3,250,817  5/1966  Lapporte.

FOREIGN PATENTS 1,140,569  12/1962  Germany.
1,144,268  2/1963  Germany.

DELBERT E. GANTZ, Primary Examiner

V. O'KEEFE, Assistant Examiner